US011825294B2

United States Patent
Xu et al.

(10) Patent No.: US 11,825,294 B2
(45) Date of Patent: Nov. 21, 2023

(54) METHOD FOR MONITORING PHYSICAL DOWNLINK CONTROL CHANNEL AND COMMUNICATIONS APPARATUS

(71) Applicant: HUAWEI TECHNOLOGIES CO., LTD., Guangdong (CN)

(72) Inventors: Haibo Xu, Beijing (CN); Jian Wang, Beijing (CN); Haitao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/267,134

(22) PCT Filed: Apr. 30, 2019

(86) PCT No.: PCT/CN2019/085160
§ 371 (c)(1),
(2) Date: Feb. 9, 2021

(87) PCT Pub. No.: WO2020/029615
PCT Pub. Date: Feb. 13, 2020

(65) Prior Publication Data
US 2021/0314862 A1    Oct. 7, 2021

(30) Foreign Application Priority Data

Aug. 10, 2018  (CN) .......................... 201810912060.9

(51) Int. Cl.
*H04B 7/185*  (2006.01)
*H04W 52/02*  (2009.01)
(Continued)

(52) U.S. Cl.
CPC ... *H04W 52/0216* (2013.01); *H04W 28/0278* (2013.01); *H04W 52/0229* (2013.01);
(Continued)

(58) Field of Classification Search
CPC ......... H04W 52/0216; H04W 28/0278; H04W 52/0229; H04W 72/0453; H04W 72/23;
(Continued)

(56) References Cited

U.S. PATENT DOCUMENTS 10,362,540 B2 *  7/2019  Chen .................... H04W 68/025
10,505,615 B2 * 12/2019  Islam ................... H04B 7/0617
(Continued)

FOREIGN PATENT DOCUMENTS

CN    101584191 A    11/2009
CN    102421148 A     4/2012
(Continued)

OTHER PUBLICATIONS

R1-1807306, Huawei et al., Design considerations for UE power saving, 3GPP TSG RAN WGI Meeting #93, Busan, Korea, May 21-25, 2018, total 4 pages.
(Continued)

*Primary Examiner* — Amancio Gonzalez

(57) ABSTRACT

A method and/or a communications apparatus controls a monitoring of a physical downlink control channel. The method includes: receiving, by a terminal device, a first message sent by a network device, where the first message includes M sleep time sets, and the sleep time is used to indicate a time length in which monitoring the PDCCH is stopped; receiving, by the terminal device, a second message sent by the network device, where the second message includes sleep time indication information, the sleep time indication information is used to indicate a target sleep time index, and the target sleep time index is an index in the M sleep time sets; and stopping, by the terminal device, monitoring the PDCCH in a target time period.

20 Claims, 4 Drawing Sheets

(51) Int. Cl.
*H04W 76/28* (2018.01)
*H04W 28/02* (2009.01)
*H04W 72/0453* (2023.01)
*H04W 72/23* (2023.01)

(52) U.S. Cl.
CPC ....... *H04W 72/0453* (2013.01); *H04W 72/23* (2023.01); *H04W 76/28* (2018.02)

(58) Field of Classification Search
CPC . H04W 76/28; H04W 24/02; H04W 52/0248; Y02D 30/70
USPC .......................................................... 370/318
See application file for complete search history.

(56) References Cited

U.S. PATENT DOCUMENTS

| | | | | |
|---|---|---|---|---|
| 11,190,996 | B2* | 11/2021 | Jung | H04W 76/27 |
| 11,368,245 | B2* | 6/2022 | Wu | H04W 72/0446 |
| 11,382,061 | B2* | 7/2022 | Kim | H04W 76/15 |
| 2010/0110897 | A1* | 5/2010 | Chun | H04L 43/0811 |
| | | | | 370/241 |
| 2010/0135159 | A1* | 6/2010 | Chun | H04W 76/28 |
| | | | | 370/241 |
| 2018/0234941 | A1* | 8/2018 | Kim | H04W 68/005 |
| 2021/0274587 | A1* | 9/2021 | Jung | H04W 12/0433 |
| 2022/0086723 | A1* | 3/2022 | Jung | H04W 36/0011 |

FOREIGN PATENT DOCUMENTS

| | | |
|---|---|---|
| CN | 102655666 A | 9/2012 |
| CN | 103200653 A | 7/2013 |
| CN | 106604376 A | 4/2017 |
| CN | 108353393 A | 7/2018 |

OTHER PUBLICATIONS

Rp-180810, vivo, Views on Rel-16 NR UE power saving, 3GPP TSG RAN Meeting #80, La Jolla, USA, Jun. 11-14, 2018, total 4 pages.

Tdoc R2-1713471, Ericsson, Remaining issues on DRX timers, 3GPP TSG-RAN WG2 #100, Reno, Nevada, USA, Nov. 27-Dec. 1, 2017, total 7 pages.

R2-1806775, Nokia et al., MAC CE details for dormant SCell state, 3GPP TSG-RAN WG2 Meeting #102, Busan, South Korea, May 21-25, 2018, total 4 pages.

3GPP TS 36.321 V14.7.0 (Jul. 2018), 3rd Generation Partnership Project; Technical Specification Group Radio Access Network; Evolved Universal Terrestrial Radio Access (E-UTRA); Medium Access Control (MAC) protocol specification (Release 14), total 110 pages.

Extended European Search Report issued in EP 19847833, dated Aug. 18, 2021, 12 pages.

Office Action dated Jan. 29, 2022 issued in Chinese Application No. 201810912060.9 (7 pages).

R1-1718901, MediaTek Inc., Summary of Bandwidth Part Operation, 3GPP TSG RAN WG1 Meeting 90bis, Prague, CZ, Oct. 9-13, 2017, total 14 pages.

Office Action issued in CN201810912060.9, dated Feb. 10, 2021, total 7 pages.

International Search Report and Written Opinion issued in PCT/CN2019/085160, dated Jul. 7, 2019, total 11 pages.

* cited by examiner

METHOD FOR MONITORING PHYSICAL DOWNLINK CONTROL CHANNEL AND COMMUNICATIONS APPARATUS

CROSS-REFERENCE TO RELATED APPLICATIONS

This application is the U.S. National Phase of International Application No. PCT/CN2019/085160, filed on 30 Apr. 2019, which claims priority to Chinese Patent Application No. 201810912060.9, filed on 10 Aug. 2018. The aforementioned patent applications are hereby incorporated by reference in their entireties.

TECHNICAL FIELD

This application relates to the field of communications technologies, and more specifically, to a method for monitoring a physical downlink control channel and a communications apparatus.

BACKGROUND

To reduce unnecessary power consumption for a terminal device, the terminal device monitors a physical downlink control channel (PDCCH) based on a discontinuous reception (DRX) mechanism. A basic principle of the DRX mechanism is as follows: A DRX cycle is configured for a terminal device in a radio resource control (RRC) connected mode. A DRX cycle consists of on duration and an opportunity for DRX. During the on duration, the terminal device monitors the PDCCH. The on duration is controlled by an on duration timer (drx-OnDurationTimer). During the opportunity for DRX, the terminal device does not monitor the PDCCH to reduce power consumption. Each time the terminal device is scheduled to initially transmit a piece of new data, an inactivity timer (drx-InactivityTimer) is enabled or re-enabled. Then, the terminal device remains in an active state until the inactivity timer expires. The inactivity timer specifies a time length in which the terminal device is continuously in the active state after successfully decoding a PDCCH for scheduling initial transmission of new data. Although the power consumption of the terminal device can be reduced based on the DRX mechanism, the terminal device can determine, only based on the DRX cycle, whether to monitor the PDCCH. This monitoring mechanism is not very flexible.

SUMMARY

This application provides a method for monitoring a physical downlink control channel and a communications apparatus, to monitor the PDCCH more flexibly.

According to a first aspect, an embodiment of this application provides a method for monitoring a PDCCH. The method includes: receiving, by a communications apparatus, a first message sent by a network device, where the first message includes M sleep time sets, the $m^{th}$ sleep time set in the M sleep time sets includes $N_m$ indexes and $N_m$ sleep times, the $N_m$ indexes are in a one-to-one correspondence with the $N_m$ sleep times, m=1, ..., M, $N_m$ is a positive integer greater than or equal to 1, and the sleep time is used to indicate a time length in which monitoring the PDCCH is stopped; receiving, by the communications apparatus, a second message sent by the network device, where the second message includes sleep time indication information, the sleep time indication information is used to indicate a target sleep time index, and the target sleep time index is an index in the M sleep time sets; and stopping, by the communications apparatus, monitoring the PDCCH in a target time period, where a time length of the target time period corresponds to a time length that is indicated by a target sleep time and in which monitoring the PDCCH is stopped, and the target sleep time corresponds to the target sleep time index. Based on the foregoing technical solution, the communications apparatus can determine, based on the indication information sent by the network device, the time in which monitoring the PDCCH is stopped. In this way, the communications apparatus can monitor the PDCCH more flexibly.

With reference to the first aspect, in a possible implementation of the first aspect, the sleep time is measured in a form of a discontinuous reception DRX cycle or a time unit. According to the foregoing technical solution, sleep time solutions in two granularities are provided.

With reference to the first aspect, in a possible implementation of the first aspect, the first message further includes time unit indication information, and the time unit indication information is used to indicate that the sleep time is measured in a form of a DRX cycle or a time unit. According to the foregoing technical solution, two selectable time granularities are provided. The communications apparatus may determine a unit granularity of the sleep time based on the indication information of the network device, so that the communications apparatus can monitor the PDCCH more flexibly.

With reference to the first aspect, in a possible implementation of the first aspect, when the sleep time is measured in a form of a DRX cycle, if the communications apparatus receives the sleep time indication information before the $n^{th}$ DRX cycle, the target time period is the $n^{th}$ DRX cycle to the $(n+x-1)^{th}$ DRX cycle; if the communications apparatus receives the sleep time indication information on the first PDCCH occasion within on duration of the $n^{th}$ DRX cycle, the target time period is the $n^{th}$ DRX cycle to the $(n+x-1)^{th}$ DRX cycle; or if the communications apparatus receives the sleep time indication information on the $n_t^{th}$ PDCCH occasion within the on duration of the $n^{th}$ DRX cycle, the target time period is the $(n+1)^{th}$ DRX cycle to the $(n+x)^{th}$ DRX cycle, where x is the time length that is indicated by the target sleep time and in which monitoring the PDCCH is stopped, and x and n are positive integers greater than or equal to 1.

With reference to the first aspect, in a possible implementation of the first aspect, when the time length is measured in a form of a DRX cycle, if the communications apparatus receives the sleep time indication information before the $n^{th}$ DRX cycle, the target time period is the $n^{th}$ DRX cycle to the $(n+x-1)^{th}$ DRX cycle; or if the communications apparatus receives the sleep time indication information on a PDCCH occasion within on duration of the $n^{th}$ DRX cycle, the target time period is from a moment at which the communications apparatus receives the sleep time indication information to the $(n+x-1)^{th}$ DRX cycle, where x is the time length that is indicated by the target sleep time and in which monitoring the PDCCH is stopped, and x and n are positive integers greater than or equal to 1.

With reference to the first aspect, in a possible implementation of the first aspect, when the time length is measured in a form of a DRX cycle, if the communications apparatus receives the sleep time indication information before the $n^{th}$ DRX cycle, the target time period is the $n^{th}$ DRX cycle to the $(n+x-1)^{th}$ DRX cycle; or if the communications apparatus receives the sleep time indication information on a PDCCH occasion within on duration of the $n^{th}$ DRX cycle, the target time period is the $(n+1)^{th}$ DRX cycle to the $(n+x)^{th}$ DRX cycle, where x is the time length that is indicated by the target sleep time and in which monitoring the PDCCH is stopped, and x and n are positive integers greater than or equal to 1.

With reference to the first aspect, in a possible implementation of the first aspect, the stopping, by the communications apparatus, monitoring the PDCCH in a target time period includes: skipping running, by the communications apparatus, an on duration timer in the target time period.

With reference to the first aspect, in a possible implementation of the first aspect, the stopping, by the communications apparatus, monitoring the PDCCH in a target time period includes: enabling, by the communications apparatus, a first timer after receiving the sleep time indication information; and if the first timer is running, skipping enabling, by the communications apparatus, an on duration timer, where a length of the first timer is x DRX cycles, x−1 DRX cycles, or x+1 DRX cycles.

With reference to the first aspect, in a possible implementation of the first aspect, when the sleep time is measured in a form of a time unit, the stopping, by the communications apparatus, monitoring the PDCCH in a target time period includes: stopping, by the communications apparatus, monitoring the PDCCH in x time units starting from a moment of receiving the sleep time indication information, where x is the time length that is indicated by the target sleep time and in which monitoring the PDCCH is stopped, and x is a positive integer greater than or equal to 1.

With reference to the first aspect, in a possible implementation of the first aspect, the stopping, by the communications apparatus, monitoring the PDCCH in x time units starting from a moment of receiving the sleep time indication information includes: skipping running, by the communications apparatus, an on duration timer or an inactivity timer in the x time units starting from the moment of receiving the sleep time indication information.

With reference to the first aspect, in a possible implementation of the first aspect, M is a positive integer greater than 1, M DRX parameter sets are configured for the communications apparatus, the M sleep time sets are in a one-to-one correspondence with the M DRX parameter sets, and the method further includes: determining, by the communications apparatus, a target sleep time set, where the target sleep time set is a sleep time set that is in the M sleep time sets and that corresponds to a DRX parameter set currently used by the communications apparatus; and determining, by the communications apparatus, a sleep time corresponding to the target sleep time index in the target sleep time set as the target sleep time.

With reference to the first aspect, in a possible implementation of the first aspect, the method further includes: if the communications apparatus triggers a buffer status report in the target time period, and the buffer status report meets a condition for triggering a scheduling request, triggering the scheduling request after the target time period ends. According to the foregoing technical solution, power consumption of the communications apparatus can be further reduced.

With reference to the first aspect, in a possible implementation of the first aspect, the method further includes: if the communications apparatus triggers a buffer status report in the target time period, the buffer status report meets a condition for triggering a scheduling request, and a logical channel for triggering the buffer status report allows delaying triggering the scheduling request, triggering the scheduling request after the target time period ends. According to the foregoing technical solution, power consumption of the communications apparatus can be further reduced.

With reference to the first aspect, in a possible implementation of the first aspect, the method further includes: when receiving the sleep time indication information, switching, by the communications apparatus, a downlink (DL) bandwidth part (BWP) of a current primary serving cell to a target DL BWP, where the target DL BWP is a DL BWP with a minimum bandwidth, a default DL BWP, or an initial DL BWP in DL BWPs configured for a corresponding serving cell. According to the foregoing technical solution, power consumption of the communications apparatus can be further reduced.

With reference to the first aspect, in a possible implementation of the first aspect, the method further includes: when receiving the sleep time indication information, switching, by the communications apparatus, downlink DL bandwidth parts BWPs of all secondary serving cells in an active state to a target DL BWP, where the target DL BWP is a DL BWP with a minimum bandwidth, a default DL BWP, or an initial DL BWP in DL BWPs configured for a corresponding serving cell. According to the foregoing technical solution, power consumption of the communications apparatus can be further reduced.

With reference to the first aspect, in a possible implementation of the first aspect, the method further includes: when receiving the sleep time indication information, deactivating, by the communications apparatus, all the secondary serving cells in the active state. According to the foregoing technical solution, power consumption of the communications apparatus can be further reduced.

With reference to the first aspect, in a possible implementation of the first aspect, the second message further includes secondary serving cell deactivation indication information, and the secondary serving cell deactivation indication information is used to indicate to deactivate all the secondary serving cells in the active state or deactivate some of the secondary serving cells in the active state; and the method further includes: deactivating, by the communications apparatus, a secondary serving cell in an active state that is indicated by the secondary serving cell deactivation indication information. According to the foregoing technical solution, power consumption of the communications apparatus can be further reduced.

With reference to the first aspect, in a possible implementation of the first aspect, the first message further includes a time threshold, and the method further includes: when the communications apparatus receives the sleep time indication information, if a length of the target sleep time is greater than or equal to the time threshold, deactivating, by the communications apparatus, all the secondary serving cells in the active state. According to the foregoing technical solution, power consumption of the communications apparatus can be further reduced.

With reference to the first aspect, in a possible implementation of the first aspect, before the communications apparatus receives the sleep time indication information, the method further includes: reporting, by the communications apparatus, at least one expected sleep time to the network device. In this way, the network device can determine the sleep time set based on the at least one expected sleep time reported by the communications apparatus.

With reference to the first aspect, in a possible implementation of the first aspect, the at least one expected sleep time is carried in terminal device capability information, terminal device assistance information, a radio resource control (RRC) connection setup complete message, an RRC connection resume complete message, or an RRC connection reestablishment complete message.

With reference to the first aspect, in a possible implementation of the first aspect, the first message is a radio resource control reconfiguration message, and the second message is downlink control information.

With reference to the first aspect, in a possible implementation of the first aspect, the communications apparatus is a terminal device or a chip.

According to a second aspect, an embodiment of this application provides a method for monitoring a PDCCH. The method includes: determining, by a communications apparatus, M sleep time sets, where the $m^{th}$ sleep time set in the M sleep time sets includes $N_m$ indexes and $N_m$ sleep times, the $N_m$ indexes are in a one-to-one correspondence with the $N_m$ sleep times, m=1, . . . , M, $N_m$ is a positive integer greater than or equal to 1, and the sleep time is used to indicate a time length in which monitoring the PDCCH is stopped; sending, by the communications apparatus, a first message to a terminal device, where the first message includes the M sleep time sets; determining, by the communications apparatus, sleep time indication information, where the sleep time indication information is used to indicate a target sleep time index, and the target sleep time index is an index in the M sleep time sets; and sending, by the communications apparatus, a second message to the terminal device, where the second message includes the sleep time indication information. Based on the foregoing technical solution, the communications apparatus can directly indicate the terminal device to determine the time in which monitoring the PDCCH in is stopped. In this way, the terminal device can monitor the PDCCH more flexibly.

With reference to the second aspect, in a possible implementation of the second aspect, the sleep time is measured in a form of a discontinuous reception (DRX) cycle or a time unit. According to the foregoing technical solution, sleep time solutions in two granularities are provided.

With reference to the second aspect, in a possible implementation of the second aspect, the first message further includes time unit indication information, and the time unit indication information is used to indicate that the sleep time is measured in a form of a DRX cycle or a time unit. According to the foregoing technical solution, two selectable time granularities are provided. The terminal device may determine a unit granularity of the sleep time based on the indication information of the communications apparatus, so that the terminal device can monitor the PDCCH more flexibly.

With reference to the second aspect, in a possible implementation of the second aspect, the second message further includes secondary serving cell deactivation indication information, and the secondary serving cell deactivation indication information is used to indicate to deactivate all secondary serving cells in an active state or deactivate some of the secondary serving cells in the active state. According to the foregoing technical solution, power consumption of the terminal device can be further reduced.

With reference to the second aspect, in a possible implementation of the second aspect, the first message further includes a time threshold.

With reference to the second aspect, in a possible implementation of the second aspect, before the terminal device receives the first message, the method further includes: receiving, by the communications apparatus, at least one expected sleep time sent by the terminal device; and determining, by a communications apparatus, M sleep time sets includes: determining, by the communications apparatus, a sleep time and an index in each of the M sleep time sets based on the at least one expected sleep time.

With reference to the second aspect, in a possible implementation of the second aspect, the first message is a radio resource control reconfiguration message, and the second message is downlink control information.

With reference to the second aspect, in a possible implementation of the second aspect, the communications apparatus is a network device or a chip.

According to a third aspect, an embodiment of this application provides a method for monitoring a PDCCH. The method includes: receiving, by a communications apparatus, a first message sent by a network device, where the first message is used to indicate the communications apparatus to stop running an on duration timer and/or an inactivity timer; and when determining that a running timer is only the on duration timer and/or the inactivity timer, stopping, by the communications apparatus, running the running timer and stopping monitoring the physical downlink control channel (PDCCH).

With reference to the third aspect, in a possible implementation of the third aspect, the method further includes: when determining that a running timer includes an uplink retransmission timer and/or a downlink retransmission timer, stopping, by the communications apparatus, monitoring the PDCCH after the retransmission timer expires.

With reference to the third aspect, in a possible implementation of the third aspect, the method further includes: when receiving the first message, switching, by the communications apparatus, a downlink (DL) bandwidth part (BWP) of a current primary serving cell to a target DL BWP, where the target DL BWP is a DL BWP with a minimum bandwidth, a default DL BWP, or an initial DL BWP in DL BWPs configured for a corresponding serving cell.

With reference to the third aspect, in a possible implementation of the third aspect, the method further includes: when receiving the first message, switching, by the communications apparatus, downlink DL BWPs of all secondary serving cells in an active state to a target DL BWP, where the target DL BWP is a DL BWP with a minimum bandwidth, a default DL BWP, or an initial DL BWP in DL BWPs configured for a corresponding serving cell.

With reference to the third aspect, in a possible implementation of the third aspect, the method further includes: when receiving the first message, deactivating, by the communications apparatus, all the secondary serving cells in the active state.

With reference to the third aspect, in a possible implementation of the third aspect, the first message further includes secondary serving cell deactivation indication information, and the secondary serving cell deactivation indication information is used to indicate to deactivate all the secondary serving cells in the active state or deactivate some of the secondary serving cells in the active state. The method further includes: deactivating, by the communications apparatus, a secondary serving cell in an active state that is indicated by the secondary serving cell deactivation indication information.

With reference to the third aspect, in a possible implementation of the third aspect, the first message is media access control information or downlink control information.

With reference to the third aspect, in a possible implementation of the third aspect, the communications apparatus is a terminal device or a chip.

According to a fourth aspect, an embodiment of this application provides a communications apparatus. The apparatus includes a module configured to perform any one of the first aspect or the possible implementations of the first aspect.

Optionally, the communications apparatus in the fourth aspect may be a terminal device, or may be a component (for example, a chip or a circuit) that can be used for a terminal device.

According to a fifth aspect, an embodiment of this application provides a communications apparatus. The apparatus includes a module configured to perform any one of the second aspect or the possible implementations of the second aspect.

Optionally, the communications apparatus in the fifth aspect may be a network device, or may be a component (for example, a chip or a circuit) that can be used for a network device.

According to a sixth aspect, an embodiment of this application provides a communications apparatus. The apparatus includes a module configured to perform any one of the third aspect or the possible implementations of the third aspect.

Optionally, the communications apparatus in the sixth aspect may be a terminal device, or may be a component (for example, a chip or a circuit) that can be used for a terminal device.

According to a seventh aspect, an embodiment of this application provides a storage medium. The storage medium stores an instruction used to implement the method according to any one of the first aspect or the possible implementations of the first aspect.

According to an eighth aspect, an embodiment of this application provides a storage medium. The storage medium stores an instruction used to implement the method according to any one of the second aspect or the possible implementations of the second aspect.

According to a ninth aspect, an embodiment of this application provides a storage medium. The storage medium stores an instruction used to implement the method according to any one of the third aspect or the possible implementations of the third aspect.

According to a tenth aspect, this application provides a computer program product including an instruction. When the computer program product runs on a computer, the computer is enabled to perform the method according to any one of the first aspect or the possible implementations of the first aspect.

According to an eleventh aspect, this application provides a computer program product including an instruction. When the computer program product runs on a computer, the computer is enabled to perform the method according to any one of the second aspect or the possible implementations of the second aspect.

According to a twelfth aspect, this application provides a computer program product including an instruction. When the computer program product runs on a computer, the computer is enabled to perform the method according to any one of the third aspect or the possible implementations of the third aspect.

DESCRIPTION OF EMBODIMENTS

Figure 1:
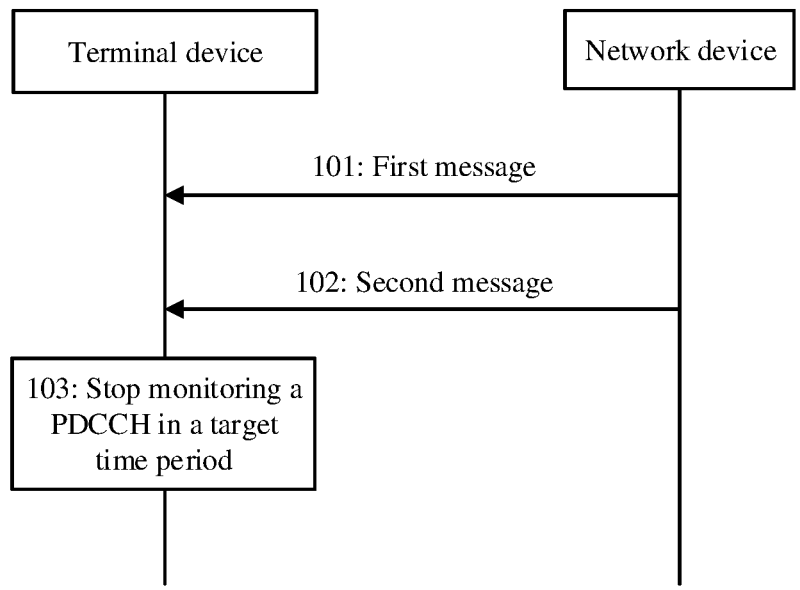
FIG. 1 is a schematic flowchart of a method for monitoring a PDCCH according to an embodiment of this application.

The following describes technical solutions of this application with reference to accompanying drawings.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following (pieces)" or a similar expression thereof refers to any combination of these items, including any combination of a single item (piece) or plural items (pieces). For example, at least one (piece) of a, b, or c may represent a, b, c, a-b, a-c, b-c, or a-b-c, where a, b, and c may be single or plural. In addition, in the embodiments of this application, words such as "first" and "second" do not limit a quantity and an execution sequence.

It should be noted that, in this application, the word "for example" is used to represent giving an example, an illustration, or a description. Any embodiment or design scheme described as "for example" in this application should not be explained as being more preferred or having more advantages than another embodiment or design scheme. Exactly, use of the word "example" or the like is intended to present a relative concept in a specific manner.

The technical solutions of the embodiments of this application may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device used to communicate with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB, or eNodeB) in an LTE system, or may be a radio controller in a cloud radio access network (cloud radio access network, C-RAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, the Linux operating system, the Unix operating system, the Android operating system, the iOS operating system, or the Windows operating system. The application layer includes applications such as a browser, an address book, word processing software, and instant messaging software. In addition, a specific structure of an execution body of the method provided in the embodiments of this application is not particularly limited in the embodiments of this application, provided that a program that records code of the method provided in the embodiments of this application can be run to perform communication according to the method provided in the embodiments of this application. For example, the execution body of the method provided in the embodiments of this application may be a terminal device or a network device, or may be a functional module that is in the terminal device or the network device and that can invoke a program and execute the program.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic flowchart of a method for monitoring a PDCCH according to an embodiment of this application. For ease of description, in the embodiment in FIG. 1, a terminal device and a network device are used as execution bodies for description. It may be understood that according to the method shown in FIG. 1, steps performed by the terminal device may alternatively be performed by a component (for example, a chip or a circuit) of the terminal device, and steps performed by the network device may alternatively be performed by a component (for example, a chip or a circuit) of the network device.

101: The terminal device receives a first message sent by the network device, where the first message includes M sleep time sets, the $m^{th}$ sleep time set in the M sleep time sets includes $N_m$ indexes and $N_m$ sleep times, the $N_m$ indexes are in a one-to-one correspondence with the $N_m$ sleep times, m=1, ..., M, $N_m$ is a positive integer greater than or equal to 1, and the sleep time is used to indicate a time length in which monitoring the PDCCH is stopped.

Optionally, in some embodiments, the sleep time is measured in a form of a DRX cycle or a time unit. In other words, in some embodiments, the sleep time is measured in a form of a DRX cycle. In some other embodiments, the sleep time is measured in a form of a time unit. The time unit in the embodiments of this application may be a millisecond (ms), a slot, a mini-slot, an orthogonal frequency division multiplexing (OFDM) symbol, or the like.

Optionally, in some embodiments, the first message may further include time unit indication information, and the time unit indication information is used to indicate that the sleep time is measured in a form of a DRX cycle or a time unit. In other words, the terminal device may determine, based on the time unit indication information, whether the sleep time is measured in a form of a DRX cycle or a time unit. Optionally, in some embodiments, the network device may alternatively send the time unit indication information to the terminal device by using another message.

For example, in some embodiments, if M is equal to 1, the sleep time set may include N indexes and N sleep times, and the N indexes are in a one-to-one correspondence with the N sleep times. For example, Table 1 is an instance of a sleep time set.

TABLE 1

| Index | Sleep time |
|-------|------------|
| 1     | 2          |
| 2     | 4          |
| 3     | 6          |
| 4     | 8          |

As shown in Table 1, assuming that the sleep time is measured in a form of a DRX cycle, a sleep time corresponding to an index value 1 is two DRX cycles, and a sleep time corresponding to an index 2 is four DRX cycles. The rest may be deduced by analogy.

If M is a positive integer greater than 1, each of the M sleep time sets may include a plurality of indexes and a plurality of sleep times.

Optionally, in some embodiments, different sleep time sets may include different quantities of indexes and sleep times. For example, if M is equal to 3, $N_1$ may be equal to 3, $N_2$ may be equal to 5, and $N_3$ may be equal to 7. In other words, a sleep time set 1 in three sleep time sets may include three indexes and three sleep times, a sleep time set 2 may include five indexes and five sleep times, and a sleep time set 3 may include seven indexes and seven sleep times.

Optionally, in some embodiments, some or all of different sleep time index sets may include same quantities of indexes and sleep times. For example, if M is equal to 3, $N_1$ may be equal to 3, $N_2$ may be equal to 3, and $N_3$ may be equal to 5. In other words, a sleep time set 1 and a sleep time set 2 in three sleep time index sets may each include three indexes and three sleep times, and a sleep time set 3 may include five sleep time sets and five indexes. For another example, if M is equal to 3, $N_1$, $N_2$, and $N_3$ are all equal to 3. In other words, a sleep time set 1, a sleep time set 2, and a sleep time set 3 in three sleep time index sets may each include three indexes and three sleep times.

102: The terminal device receives a second message sent by the network device, where the second message includes sleep time indication information, the sleep time indication information is used to indicate a target sleep time index, and the target sleep time index is an index in the M sleep time sets.

The terminal device may determine the target sleep time index based on the second message, to further determine a target sleep time and a target time period.

103: The terminal device stops monitoring the PDCCH in the target time period, where a time length of the target time period corresponds to a time length that is indicated by the target sleep time and in which monitoring the PDCCH is stopped, and the target sleep time corresponds to the target sleep time index.

Table 1 is still used as an example. If the target sleep time index is 2, a length of the target sleep time is four DRX cycles.

Based on the foregoing technical solution, the terminal device can determine, based on the indication information sent by the network device, the time in which monitoring the PDCCH is stopped. In this way, the terminal device can monitor the PDCCH more flexibly.

Optionally, in some embodiments, when the sleep time is measured in a form of a DRX cycle, if the terminal device receives the sleep time indication information before the $n^{th}$ DRX cycle, the target time period is the $n^{th}$ DRX cycle to the $(n+x-1)^{th}$ DRX cycle; if the terminal device receives the sleep time indication information on the first PDCCH occasion (PDCCH occasion) within on duration of the $n^{th}$ DRX cycle, the target time period is the $n^{th}$ DRX cycle to the $(n+x-1)^{th}$ DRX cycle; or if the terminal device receives the sleep time indication information on the $n_t^{th}$ PDCCH occasion within the on duration of the $n^{th}$ DRX cycle, the target time period is the $(n+1)^{th}$ DRX cycle to the $(n+x)^{th}$ DRX cycle, where x is the time length that is indicated by the target sleep time and in which monitoring the PDCCH is stopped, and x and n are positive integers greater than or equal to 1. In other words, if the terminal device receives the sleep time indication information before the $n^{th}$ DRX cycle or on the first PDCCH within the on duration of the $n^{th}$ DRX cycle, the terminal device sleeps for x DRX cycles starting from the $n^{th}$ DRX cycle. If the terminal device receives the sleep time indication information at a PDCCH time other than the first PDCCH occasion of the $n^{th}$ DRX cycle, the terminal device sleeps for x DRX cycles starting from the $(n+1)^{th}$ DRX cycle. The terminal device does not monitor the PDCCH within on duration of the x sleep DRX cycles. The terminal device does not monitor the PDCCH within an opportunity for DRX of the x sleep DRX cycles either.

Optionally, in some other embodiments, when the time length is measured in a form of a DRX cycle, if the terminal device receives the sleep time indication information before the $n^{th}$ DRX cycle, the target time period is the $n^{th}$ DRX cycle to the $(n+x-1)^{th}$ DRX cycle; or if the terminal device receives the sleep time indication information on a PDCCH occasion within on duration of the $n^{th}$ DRX cycle, the target time period is from a moment at which the terminal device receives the sleep time indication information to the $(n+x-1)^{th}$ DRX cycle, where x is the time length that is indicated by the target sleep time and in which monitoring the PDCCH is stopped, and x and n are positive integers greater than or equal to 1. In other words, if the terminal device receives the sleep time indication information before the $n^{th}$ DRX cycle, the terminal device sleeps for x DRX cycles starting from the $n^{th}$ DRX cycle. If the terminal device receives the sleep time indication information on the PDCCH occasion of the $n^{th}$ DRX cycle, the terminal device starts to sleep from the moment of receiving the sleep time indication information until the $(n+x-1)^{th}$ DRX cycle. The terminal device does not monitor the PDCCH within on duration of the sleep DRX cycles. The terminal device does not monitor the PDCCH within an opportunity for DRX of the sleep DRX cycles either.

Optionally, in some other embodiments, when the time length is measured in a form of a DRX cycle, if the terminal device receives the sleep time indication information before the $n^{th}$ DRX cycle, the target time period is the $n^{th}$ DRX cycle to the $(n+x-1)^{th}$ DRX cycle; or if the terminal device receives the sleep time indication information on a PDCCH occasion within on duration of the $n^{th}$ DRX cycle, the target time period is the $(n+1)^{th}$ DRX cycle to the $(n+x)^{th}$ DRX cycle, where x is the time length that is indicated by the target sleep time and in which monitoring the PDCCH is stopped, and x and n are positive integers greater than or equal to 1. In other words, if the terminal device receives the sleep time indication information before the $n^{th}$ DRX cycle, the terminal device sleeps for x DRX cycles starting from the $n^{th}$ DRX cycle. If the terminal device receives the sleep time indication information on the PDCCH occasion of the $n^{th}$ DRX cycle, the terminal device sleeps for x DRX cycles starting from the $(n+1)^{th}$ DRX cycle. The terminal device does not monitor the PDCCH within on duration of the sleep DRX cycles. The terminal device does not monitor the PDCCH within an opportunity for DRX of the sleep DRX cycles either.

That the terminal device stops monitoring the PDCCH in the target time period includes: skipping running, by the terminal device, an on duration timer in the target time period. Optionally, in some embodiments, the on duration timer has not been enabled before a start moment of the target time period. In this case, the skipping running, by the terminal device, an on duration timer in the target time period includes: skipping enabling, by the terminal device, the on duration timer. Optionally, in some embodiments, the on duration timer has been enabled before the start moment of the target time period, and an end moment of the on duration timer is later than the start moment of the target time period. In this case, the skipping running, by the terminal device, an on duration timer in the target time period includes: stopping, by the terminal device, running the on duration timer.

Optionally, in some other embodiments, after receiving the sleep time indication information, the terminal device enables a timer. For example, the timer may be referred to as a sleep timer. A length of the sleep timer is x DRX cycles, x−1 DRX cycles, or x+1 DRX cycles. During running of the sleep timer, the terminal device does not enable the on duration timer at a moment that is defined in the prior art and at which the terminal device needs to enable the on duration timer. In other words, only when the sleep timer does not run, the terminal device enables the on duration timer at the moment that is defined in the prior art and at which the terminal device needs to enable the on duration timer.

Optionally, in some embodiments, when the sleep time is measured in a form of a time unit, that the terminal device stops monitoring the PDCCH in the target time period includes: stopping, by the terminal device, monitoring the PDCCH in x time units starting from the moment of receiving the sleep time indication information, where x is the time length that is indicated by the target sleep time and in which monitoring the PDCCH is stopped, and x is a positive integer greater than or equal to 1. In other words, the target time period is the x time units starting from the moment at which the terminal device receives the sleep time indication information. Further, when receiving the sleep time indication information, the terminal device does not enable or re-enable an inactivity timer. Further, after the x time units end, the terminal device starts to monitor the PDCCH.

Optionally, in some embodiments, the stopping, by the terminal device, monitoring the PDCCH in x time units starting from the moment of receiving the sleep time indication information includes: skipping running, by the terminal device, an on duration timer or an inactivity timer in the x time units starting from the moment of receiving the sleep time indication information. Further, when receiving the sleep time indication information, the terminal device does not enable or re-enable the inactivity timer. Further, after the x time units end, the terminal device runs the on duration timer or the inactivity timer.

Optionally, in some embodiments, the on duration timer has not been enabled before a start moment of the target time period. In this case, the terminal device does not enable the on duration timer. Optionally, after the x time units end, the terminal device enables or re-enables the on duration timer. Optionally, in some embodiments, the on duration timer has been enabled before the start moment of the target time period, and the on duration timer is still running before the start moment of the target time period. In this case, the terminal device stops running the on duration timer. Optionally, after the x time units end, the terminal device enables or re-enables the on duration timer.

Optionally, in some embodiments, the inactivity timer has not been enabled before the start moment of the target time period. In this case, the terminal device does not enable the inactivity timer. Optionally, after the x time units end, the terminal device enables or re-enables the inactivity timer. Optionally, in some embodiments, the inactivity timer has been started before the start moment of the target time period, and the inactivity timer is still running before the start moment of the target time period. In this case, the terminal device can stop running the inactivity timer. Optionally, after the x time units end, the terminal device enables or re-enables the inactivity timer.

Optionally, in some embodiments, when the sleep time is measured in a form of a time unit, that the terminal device stops monitoring the PDCCH in the target time period includes: enabling, by the terminal device, a timer when receiving the sleep time indication information, where the timer may be, for example, referred to as a sleep timer. Optionally, when the terminal device receives the sleep time indication information, if at least one of Condition 1 to Condition 3 is not met, the terminal device does not enable the sleep timer; or otherwise, the terminal enables the sleep timer. Condition 1: A random access contention resolution timer is running Condition 2: The terminal sends a scheduling request on a physical uplink control channel, and the scheduling request is in a to-be-processed state. Condition 3: A random access response window is running A length of the sleep timer is x time units. During running of the sleep timer, the terminal device does not monitor the PDCCH. In other words, the terminal device monitors the PDCCH only when the sleep timer does not run and the terminal meets at least one of conditions for monitoring the PDCCH. Optionally, the conditions for monitoring the PDCCH include but are not limited to the following Condition 4 to Condition 10. Condition 4: The on duration timer is running Condition 5: The inactivity timer is running Condition 6: At least one DRX uplink retransmission timer is running Condition 7: At least one DRX downlink retransmission timer is running Condition 8: A random access contention resolution timer is running Condition 9: The terminal sends a scheduling request on a physical uplink control channel, and the scheduling request is in a to-be-processed state. Condition 10: The terminal successfully receives a random access response for non-contention based random access, but does not receive a physical downlink control channel that is addressed by using a cell-radio network temporary identifier and that indicates new data transmission. Condition 11: A random access response window is running. Optionally, only when the sleep timer does not run and any one of Condition 3 to Condition 11 is met, it is considered that a current time is an active time. Optionally, when the sleep timer is running, if any one of the following Event 1 to Event 6 occurs, the terminal device stops the sleep timer, or considers that the sleep timer expires. Event 1: At least one DRX uplink retransmission timer is enabled or re-enabled. Event 2: At least one DRX downlink retransmission timer is enabled or re-enabled. Event 3: A random access contention resolution timer is enabled. Event 4: The terminal sends a scheduling request on a physical uplink control channel. Event 5: The terminal successfully receives a random access response for non-contention based random access. Event 6: A random access response window is enabled. Further, when receiving the sleep time indication information, the terminal device does not enable or re-enable the inactivity timer. Further, after the sleep timer expires, if the on duration timer and/or the inactivity timer are/is running, the terminal device monitors the PDCCH. Further, when the terminal device receives the sleep time indication information, if any one of the on duration timer, the inactivity timer, the DRX uplink retransmission timer, and the DRX downlink retransmission timer is running, the terminal device does not stop the running timer. Optionally, a media access control MAC entity of the terminal maintains the sleep timer. When the MAC entity enables the sleep time timer, the MAC entity notifies a physical layer and the physical layer stops monitoring the PDCCH. When the MAC entity stops the sleep time timer or considers that the sleep time timer expires, the MAC entity notifies the physical layer, and the physical layer resumes monitoring the PDCCH. Optionally, in some embodiments, when the sleep time is measured in a form of a time unit, that the terminal device stops monitoring the PDCCH in the target time period includes: after the terminal device receives the sleep time indication information, if a length of the target sleep time is greater than or equal to a remaining time length of the on duration timer and/or the inactivity timer, stopping, by the terminal device, the on duration timer and/or the inactivity timer. Further, the terminal device enables the on duration timer at a moment that is in a next DRX cycle and at which the on duration timer needs to be enabled, and monitors the PDCCH when the on duration timer runs.

Optionally, in some embodiments, when the sleep time is measured in a form of a time unit, that the terminal device stops monitoring the PDCCH in the target time period includes: The sleep time set includes a special value, where the special value is used to indicate the terminal device to stop the on duration timer and/or the inactivity timer; after the terminal device receives the sleep time indication information, if the target sleep time index indicated by the sleep time indication information corresponds to the special value, the terminal device stops the on duration timer and/or the inactivity timer. Further, the terminal device enables the on duration timer at a moment that is in a next DRX cycle and at which the on duration timer needs to be enabled, and monitors the PDCCH when the on duration timer runs.

Optionally, in some embodiments, when the sleep time is measured in a form of a time unit, that the terminal device stops monitoring the PDCCH in the target time period includes: In addition to indicating the target sleep time index, the sleep time indication information further includes a special value, where the special value is not used to indicate any index in the sleep time set, but is used to indicate the terminal device to stop the on duration timer and/or the inactivity timer; after the terminal device receives the sleep time indication information, if the sleep time indication information is the special value, the terminal device stops the on duration timer and/or the inactivity timer. Further, the terminal device enables the on duration timer at a moment that is in a next DRX cycle and at which the on duration timer needs to be enabled, and monitors the PDCCH when the on duration timer runs.

Optionally, in some embodiments, when the sleep time is measured in a form of a time unit, that the terminal device stops monitoring the PDCCH in the target time period includes: after the terminal device receives the sleep time indication information, if a length of the target sleep time is less than a remaining time length of the on duration timer and/or the inactivity timer, stopping, by the terminal device, the on duration timer and/or the inactivity timer. Further, after the target time period in which monitoring of the PDCCH is stopped ends, the terminal device monitors the PDCCH. When the terminal device monitors the PDCCH, if the terminal device receives the sleep time indication information again, the terminal device stops monitoring the PDCCH in the target time period. Alternatively, when the terminal device monitors the PDCCH, if the terminal device receives indication information for scheduling new data, the terminal device enables or re-enables the inactivity timer, and monitors the PDCCH when the inactivity timer runs.

Optionally, in some embodiments, when the sleep time is measured in a form of a time unit, that the terminal device stops monitoring the PDCCH in the target time period includes: after the terminal device receives the sleep time indication information, if a length of the target sleep time is less than a remaining time length of the on duration timer and/or the inactivity timer, stopping, by the terminal device, the on duration timer and/or the inactivity timer, and enabling a timer, where the timer may be, for example, referred to as a sleep timer. A length of the sleep timer is x time units. During running of the sleep timer, the terminal device does not monitor the PDCCH. Further, after the sleep timer expires, the terminal device monitors the PDCCH. When the terminal device monitors the PDCCH, if the terminal device receives the sleep time indication information again, the terminal device stops monitoring the PDCCH in the target time period. Alternatively, when the terminal device monitors the PDCCH, if the terminal device receives indication information for scheduling new data, the terminal device enables or re-enables the inactivity timer, and monitors the PDCCH when the inactivity timer runs.

Optionally, in some embodiments, M is a positive integer greater than 1, M DRX parameter sets are configured for the terminal device, and the M sleep time sets are in a one-to-one correspondence with the M DRX parameter sets. The method may further include: determining, by the terminal device, a target sleep time set, where the target sleep time set is a sleep time set that is in the M sleep time sets and that corresponds to a DRX parameter set currently used by the terminal device; and determining, by the terminal device, a sleep time corresponding to the target sleep time index in the target sleep time set as the target sleep time.

Each DRX parameter set may include at least one of the following DRX parameters: a length and an offset value of a DRX cycle, a length of the on duration timer, a length of the inactivity timer, a length of the uplink retransmission timer, a length of the downlink retransmission timer, an uplink hybrid automatic repeat request round trip time timer, and a downlink hybrid automatic repeat request round trip time timer.

For example, M is equal to 2. A DRX cycle in a DRX parameter set 1 is a length of a first DRX cycle. A DRX cycle in a DRX parameter set 2 is a length of a second DRX cycle. A sleep time set 1 corresponds to the DRX parameter set 1, and a sleep time set 2 corresponds to the DRX parameter set 2. Assuming that the currently used DRX parameter set is the DRX parameter set 2, the target sleep time set is the target sleep time set 2.

Optionally, in some embodiments, the method further includes: if the terminal device triggers a buffer status report in the target time period, and the buffer status report meets a condition for triggering a scheduling request, triggering the scheduling request after the target time period ends.

Optionally, in some other embodiments, the method further includes: if the terminal device triggers a buffer status report in the target time period, the buffer status report meets a condition for triggering a scheduling request, and a logical channel for triggering the buffer status report allows delaying triggering the scheduling request, triggering the scheduling request after the target time period ends.

Optionally, in some embodiments, the method further includes: when the terminal device receives the second message, if the terminal device previously sends an SR on a PUCCH and the SR is in a to-be-processed state, canceling, by the terminal device, the to-be-processed SR. Further, optionally, the terminal stops an SR prohibit timer corresponding to the SR. Optionally, the terminal device cancels all to-be-processed SRs. Further, optionally, the terminal device stops all running SR prohibit timers. Further, the terminal device stops monitoring the PDCCH in the target time period indicated by the sleep time indication information included in the second message.

Optionally, in some other embodiments, the method further includes: when the terminal device receives the second message, if the terminal device previously sends an SR on a PUCCH and the SR is in a to-be-processed state, ignoring, by the terminal device, the sleep time indication information included in the second message, and continuing to monitor the PDCCH.

Optionally, in some embodiments, the method further includes: when there is an SR in a to-be-processed state, if the terminal device receives the second message and the second message indicates the terminal device to cancel the SR in the to-be-processed state, canceling, by the terminal device, the SR in the to-be-processed state; and stopping monitoring the PDCCH in the target time period indicated by the sleep time indication information included in the second message, or stopping, by the terminal device, an SR prohibit timer; or if the second message does not indicate the terminal device to cancel the SR in the to-be-processed state, ignoring, by the terminal device, the sleep time indication information in the second message, and continuing to monitor the PDCCH. Optionally, the second message may include first indication information. If a value of the first indication information is a first value, for example, 1, the terminal device is indicated to cancel the SR in the to-be-processed state. Otherwise, if a value of the first indication information is a second value, for example, 0, the terminal device is indicated to not cancel the SR in the to-be-processed state. Optionally, if the second message includes a first indication information, the terminal device is indicated to cancel the SR in the to-be-processed state. Otherwise, if the second message does not include the first indication information, the terminal device is indicated not to cancel the SR in the to-be-processed state.

Optionally, in some embodiments, the method further includes: when the terminal device receives the second message, if a random access contention resolution timer of the terminal device is running, considering, by the terminal device, that random access contention resolution succeeds. Further, the terminal stops the contention resolution timer. Further, the terminal device discards a temporary cell-radio network temporary identifier temporary-C-RNTI. Further, the terminal device considers that this random access process is successfully complete. Further, the terminal device stops monitoring the PDCCH in the target time period indicated by the sleep time indication information included in the second message.

Optionally, in some other embodiments, the method further includes: when the terminal device receives the second message, if a random access contention resolution timer of the terminal device is running, ignoring, by the terminal, the sleep time indication information included in the second message, and continuing to monitor the PDCCH. Optionally, in some embodiments, the method further includes: When the random access contention resolution timer is running, if the terminal device receives the second message, and the second message indicates that random access contention resolution of the terminal device succeeds, the terminal device considers that the random access contention resolution succeeds, and stops monitoring the PDCCH in the target time period indicated by the sleep time indication information included in the second message; optionally, the terminal device stops the random access contention resolution timer, discards a temporary cell-radio network temporary identifier temporary-C-RNTI, and further considers that this random access process is successfully complete; or if the second message does not indicate that random access contention resolution of the terminal device succeeds, the terminal device ignores the sleep time indication information in the second message, and continues to monitor the PDCCH. Optionally, the second message may include second indication information. If a value of the second indication information is a first value, for example, 1, it indicates that the random access contention resolution of the terminal device succeeds. Otherwise, if a value of the second indication information is a second value, for example, 0, it does not indicate that the random access contention resolution of the terminal device succeeds. Optionally, if the second message includes indication information, it indicates that the random access contention resolution of the terminal device succeeds. Otherwise, if the second message does not include the second indication information, it does not indicate that the random access contention resolution of the terminal device succeeds.

Optionally, in some embodiments, the method further includes: when receiving the sleep time indication information, switching, by the terminal device, a downlink (DL) bandwidth part (BWP) of a current primary serving cell to a target DL BWP, where the target DL BWP is a DL BWP with a minimum bandwidth, a default DL BWP, or an initial DL BWP in DL BWPs configured for a corresponding serving cell.

Optionally, in some embodiments, the method further includes: when receiving the sleep time indication information, switching, by the terminal device, downlink DL BWPs of all secondary serving cells in an active state to a target DL BWP, where the target DL BWP is a DL BWP with a minimum bandwidth, a default DL BWP, or an initial DL BWP in DL BWPs configured for a corresponding serving cell.

In other words, in some embodiments, the terminal device may switch only the DL BWP of the current primary serving cell to the target DL BWP. In some other embodiments, the terminal device may switch only the DL BWP of the secondary serving cell in the active state to the target DL BWP. In some other embodiments, the terminal device may switch both the DL BWP of the current primary serving cell and the DL BWP of the secondary serving cell in the active state to the target DL BWP. According to the foregoing technical solution, power of the terminal device can be further reduced.

In addition, the terminal device may further deactivate the secondary serving cell in the active state. In other words, the terminal device may perform both DL BWP switching and deactivating the secondary serving cell in the active state. Certainly, the terminal device may alternatively perform only one of two operations: DL BWP switching and deactivating the secondary serving cell in the active state.

Optionally, in some embodiments, the method further includes: when receiving the sleep time indication information, deactivating, by the terminal device, all secondary serving cells in an active state.

Optionally, in some embodiments, the second message further includes secondary serving cell deactivation indication information, and the secondary serving cell deactivation indication information is used to indicate to deactivate all secondary serving cells in an active state or deactivate some of the secondary serving cells in the active state.

Optionally, in some other embodiments, the network device may alternatively separately send the secondary serving cell deactivation indication information to the terminal device. In other words, the network device may send a third message to the terminal device, and the third message includes the secondary serving cell deactivation indication information.

Optionally, in some embodiments, the secondary serving cell deactivation indication information is used to indicate the terminal device whether to deactivate all the secondary serving cells in the active state. The method further includes: after the terminal device receives the second message, if the secondary serving cell deactivation indication information indicates the terminal device to deactivate all the secondary serving cells in the active state, deactivating, by the terminal device, all the secondary serving cells in the active state; or if the secondary serving cell deactivation indication information indicates the terminal device not to deactivate all the secondary serving cells in the active state, skipping deactivating, by the terminal device, all the secondary serving cells in the active state.

Optionally, in some embodiments, the secondary serving cell deactivation indication information is used to indicate the terminal device to deactivate some of the secondary serving cells in the active state. The secondary serving cell deactivation indication information may be bitmap information, and each bit in a bitmap corresponds to one secondary serving cell. For example, a bit 0 corresponds to a secondary serving cell whose secondary serving cell index value is 0, and a bit 1 corresponds to a secondary serving cell whose secondary serving cell index value is 1. When a value of a bit is 0, the terminal device is indicated to deactivate a corresponding secondary serving cell, or when a value of a bit is 1, the terminal device is indicated to deactivate a corresponding secondary serving cell. Alternatively, the secondary serving cell deactivation indication information may be a secondary serving cell index value. For example, when the secondary serving cell deactivation indication information includes 0, the terminal device is indicated to deactivate a secondary serving cell whose secondary serving cell index value is 0. The method further includes: deactivating, by the terminal device, a secondary serving cell in an active state that is indicated by the secondary serving cell deactivation indication information.

Optionally, in some embodiments, the secondary serving cell deactivation indication information is used to indicate the terminal device to deactivate some of the secondary serving cells in the active state. The secondary serving cell deactivation indication information may include a secondary serving cell list. The terminal device may determine, based on the list, a secondary serving cell that needs to be deactivated. Optionally, in some embodiments, a cell included in the list may be a secondary serving cell that is in an active state. In other words, the network device may first determine a secondary serving cell in an active state that needs to be deactivated, and then indicate the corresponding secondary serving cell to the terminal device. Optionally, in some other embodiments, the list may include a secondary serving cell in an active state, and may also include a secondary serving cell in an inactive state. In other words, the network device indicates, to the terminal device, the cell that needs to be deactivated. If a cell in the list is in an active state, the terminal device deactivates the cell; or if a cell in the list is in an inactive state, the terminal device does not need to perform a deactivation operation on the cell. Optionally, in some other embodiments, the secondary serving cell deactivation indication information may be used to indicate to deactivate only some of the secondary serving cells in the active state. In this case, the terminal device may determine a secondary serving cell in an active state that needs to be deactivated. Optionally, in some other embodiments, the secondary serving cell deactivation indication information may include a quantity or proportion of secondary serving cells that need to be deactivated. The terminal device may deactivate a secondary serving cell in an active state based on the quantity or the proportion.

Optionally, in some embodiments, the first message further includes a time threshold, and the method further includes: when the terminal device receives the sleep time indication information, if a length of the target sleep time is greater than or equal to the time threshold, deactivating, by the terminal device, all secondary serving cells in the active state.

Optionally, in some embodiments, before the terminal device receives the first message, the method further includes: reporting, by the terminal device, at least one expected sleep time to the network device. The network device may determine, based on the at least one expected sleep time, a sleep time in a sleep time set and an index corresponding to each sleep time, and then send the sleep time set to the terminal device. The at least one expected sleep time may be carried in terminal device capability information (which may also be referred to as UE capability information), terminal device assistance information (which may also be referred to as UE assistance information), a radio resource control (RRC) connection setup complete message, an RRC connection resume complete message, or an RRC connection reestablishment complete message.

Optionally, in some other embodiments, the network device may alternatively determine the M sleep time sets in another manner. For example, the network device may determine the M sleep time sets based on an internal policy. Alternatively, the M sleep time sets may be preset inside the network device.

The network device may determine the target sleep time index based on a time at which downlink information is sent to the terminal device. For example, when the network device does not send the downlink information to the terminal device in a time period by using the PDCCH, the network device determines a sleep time index corresponding to the time period as the target sleep time index. The network device may alternatively determine the target sleep time index based on the at least one expected sleep time.

Optionally, in some embodiments, the first message is a radio resource control reconfiguration message, and the second message is downlink control information (DCI).

Figure 2:
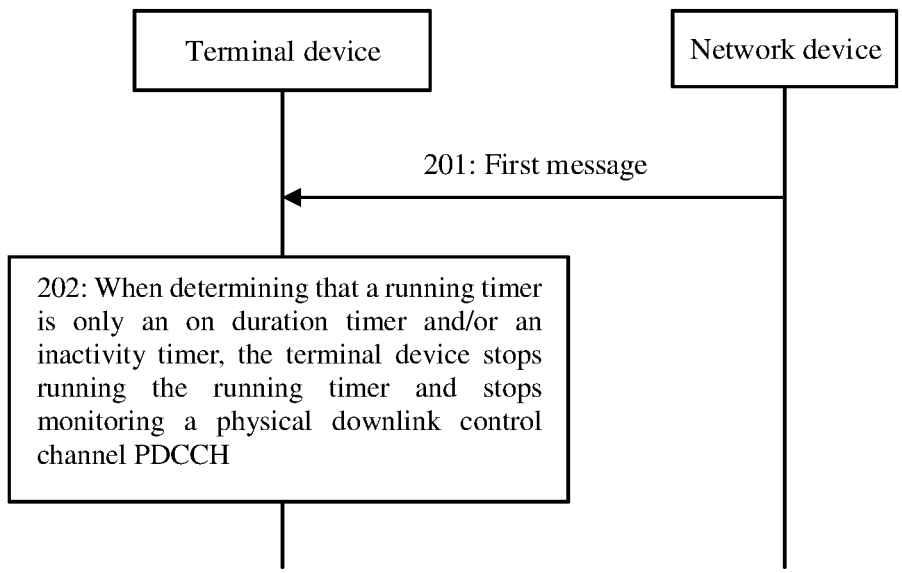
FIG. 2 is a schematic flowchart of another method for monitoring a PDCCH according to an embodiment of this application.

FIG. 2 is a schematic flowchart of another method for monitoring a PDCCH according to an embodiment of this application. For ease of description, in the embodiment in FIG. 2, a terminal device and a network device are used as execution bodies for description. It may be understood that according to the method shown in FIG. 2, steps performed by the terminal device may alternatively be performed by a component (for example, a chip or a circuit) of the terminal device, and steps performed by the network device may alternatively be performed by a component (for example, a chip or a circuit) of the network device.

201: The terminal device receives a first message sent by the network device, where the first message is used to indicate the terminal device to stop running an on duration timer and/or an inactivity timer.

202: When determining that a running timer is only the on duration timer and/or the inactivity timer, the terminal device stops running the running timer and stops monitoring the physical downlink control channel (PDCCH).

Optionally, this embodiment further includes the following steps:

203: When determining that a running timer includes an uplink retransmission timer and/or a downlink retransmission timer, the terminal device stops monitoring the PDCCH after the retransmission timer expires.

Optionally, in some embodiments, the method further includes: when receiving the first message, switching, by the terminal device, a downlink (DL) bandwidth part (BWP) of a current primary serving cell to a target DL BWP, where the target DL BWP is a DL BWP with a minimum bandwidth, a default DL BWP, or an initial DL BWP in DL BWPs configured for a corresponding serving cell.

Optionally, in some embodiments, the method further includes: when receiving the first message, switching, by the terminal device, downlink DL BWPs of all secondary serving cells in an active state to a target DL BWP, where the target DL BWP is a DL BWP with a minimum bandwidth, a default DL BWP, or an initial DL BWP in DL BWPs configured for a corresponding serving cell.

In other words, in some embodiments, the terminal device may switch only the DL BWP of the current primary serving cell to the target DL BWP. In some other embodiments, the terminal device may switch only the DL BWP of the secondary serving cell in the active state to the target DL BWP. In some other embodiments, the terminal device may switch both the DL BWP of the current primary serving cell and the DL BWP of the secondary serving cell in the active state to the target DL BWP. According to the foregoing technical solution, power of the terminal device can be further reduced.

In addition, the terminal device may further deactivate the secondary serving cell in the active state. In other words, the terminal device may perform both DL BWP switching and deactivating the secondary serving cell in the active state. Certainly, the terminal device may alternatively perform only one of two operations: DL BWP switching and deactivating the secondary serving cell in the active state.

Optionally, in some embodiments, the method further includes: when receiving the first message, deactivating, by the terminal device, all secondary serving cells in an active state.

Optionally, in some embodiments, the first message further includes secondary serving cell deactivation indication information, and the secondary serving cell deactivation indication information is used to indicate to deactivate all secondary serving cells in an active state or deactivate some of the secondary serving cells in the active state.

Optionally, in some embodiments, the secondary serving cell deactivation indication information is used to indicate the terminal device whether to deactivate all the secondary serving cells in the active state. The method further includes: after the terminal device receives the second message, if the secondary serving cell deactivation indication information indicates the terminal device to deactivate all the secondary serving cells in the active state, deactivating, by the terminal device, all the secondary serving cells in the active state; or if the secondary serving cell deactivation indication information indicates the terminal device not to deactivate all the secondary serving cells in the active state, skipping deactivating, by the terminal device, all the secondary serving cells in the active state.

Optionally, in some embodiments, the secondary serving cell deactivation indication information is used to indicate the terminal device to deactivate some of the secondary serving cells in the active state. The secondary serving cell deactivation indication information may be bitmap information, and each bit in a bitmap corresponds to one secondary serving cell. For example, a bit 0 corresponds to a secondary serving cell whose secondary serving cell index value is 0, and a bit 1 corresponds to a secondary serving cell whose secondary serving cell index value is 1. When a value of a bit is 0, the terminal device is indicated to deactivate a corresponding secondary serving cell, or when a value of a bit is 1, the terminal device is indicated to deactivate a corresponding secondary serving cell. Alternatively, the secondary serving cell deactivation indication information may be a secondary serving cell index value. For example, when the secondary serving cell deactivation indication information includes 0, the terminal device is indicated to deactivate a secondary serving cell whose secondary serving cell index value is 0. The method further includes: deactivating, by the terminal device, a secondary serving cell in an active state that is indicated by the secondary serving cell deactivation indication information.

Optionally, in some embodiments, the secondary serving cell deactivation indication information is used to indicate the terminal device to deactivate some of the secondary serving cells in the active state. The secondary serving cell deactivation indication information may include a secondary serving cell list. The terminal device may determine, based on the list, a secondary serving cell that needs to be deactivated. Optionally, in some embodiments, a cell included in the list may be a secondary serving cell that is in an active state. In other words, the network device may first determine a secondary serving cell in an active state that needs to be deactivated, and then indicate the corresponding secondary serving cell to the terminal device. Optionally, in some other embodiments, the list may include a secondary serving cell in an active state, and may also include a secondary serving cell in an inactive state. In other words, the network device indicates, to the terminal device, the cell that needs to be deactivated. If a cell in the list is in an active state, the terminal device deactivates the cell; or if a cell in the list is in an inactive state, the terminal device does not need to perform a deactivation operation on the cell. Optionally, in some other embodiments, the secondary serving cell deactivation indication information may be used to indicate to deactivate only some of the secondary serving cells in the active state. In this case, the terminal device may determine a secondary serving cell in an active state that needs to be deactivated. Optionally, in some other embodiments, the secondary serving cell deactivation indication information may include a quantity or proportion of secondary serving cells that need to be deactivated. The terminal device may deactivate a secondary serving cell in an active state based on the quantity or the proportion.

Optionally, in some embodiments, the first message is media access control information (medium access control control element, MAC CE), or is downlink control information (DCI).

Figure 3:
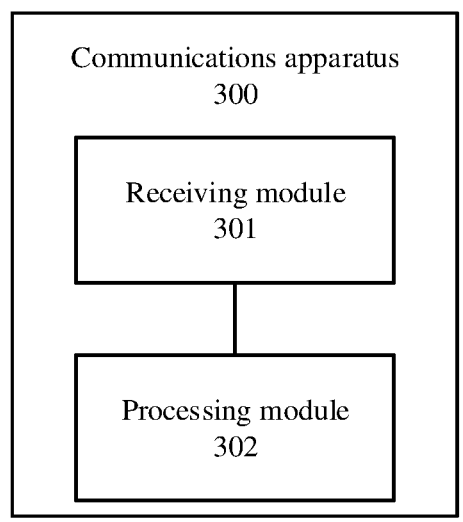
FIG. 3 is a structural block diagram of a communications apparatus according to an embodiment of this application.

FIG. 3 is a structural block diagram of a communications apparatus according to an embodiment of this application. The communications apparatus may be a terminal, or may be a component (for example, a chip or a circuit) that can be used for a terminal. As shown in FIG. 3, the communications apparatus 300 may include a receiving module 301 and a processing module 302.

The receiving module 301 is configured to receive a first message sent by a network device, where the first message includes M sleep time sets, the $m^{th}$ sleep time set in the M sleep time sets includes $N_m$ indexes and $N_m$ sleep times, the $N_m$ indexes are in a one-to-one correspondence with the $N_m$ sleep times, m=1, . . . , M, $N_m$ is a positive integer greater than or equal to 1, and the sleep time is used to indicate a time length in which monitoring the PDCCH is stopped.

The receiving module 301 is further configured to receive a second message sent by the network device, where the second message includes sleep time indication information, the sleep time indication information is used to indicate a target sleep time index, and the target sleep time index is an index in the M sleep time sets.

The processing module 302 is configured to stop monitoring the PDCCH in a target time period, where a time length of the target time period corresponds to a time length that is indicated by a target sleep time and in which monitoring the PDCCH is stopped, and the target sleep time corresponds to the target sleep time index.

In a possible manner, the receiving module 301 may be implemented by a receiver, and the processing module 302 may be implemented by a processor. For specific functions and beneficial effects of the receiving module 301 and the processing module 302, refer to the method shown in FIG. 1. Details are not described herein.

In a possible embodiment, a communications apparatus is further provided. The communications apparatus may be a terminal, or may be a component (for example, a chip or a circuit) that can be used for a terminal. The communications apparatus may include a processor, and optionally, may further include a transceiver and a memory. The processor may be configured to implement a corresponding function and a corresponding operation of the processing module. The memory may be configured to store an execution instruction or application program code, and the processor controls execution of the execution instruction or the application program code, to implement the communication method provided in the foregoing embodiments of this application; and/or the memory may be configured to temporarily save some data, instruction information, and the like. The memory may exist independent of the processor. In this case, the memory may be connected to the processor by using a communications line. In still another possible design, the memory may alternatively be integrated with the processor. This is not limited in the embodiments of this application.

Figure 4:
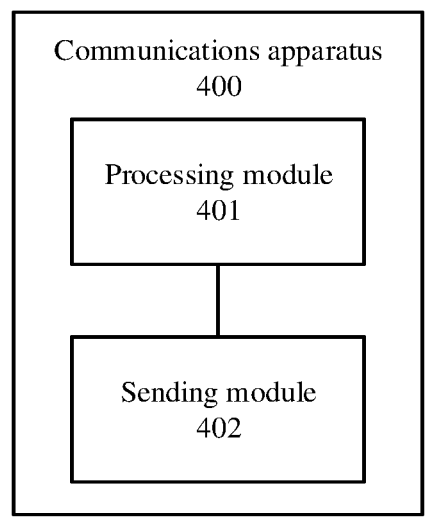
FIG. 4 is a structural block diagram of a communications apparatus according to an embodiment of this application.

FIG. 4 is a structural block diagram of a communications apparatus according to an embodiment of this application. As shown in FIG. 4, the communications apparatus 400 includes a processing module 401 and a sending module 402.

The processing module 401 is configured to determine M sleep time sets, where the $m^{th}$ sleep time set in the M sleep time sets includes $N_m$ indexes and $N_m$ sleep times, the $N_m$ indexes are in a one-to-one correspondence with the $N_m$ sleep times, m=1, ..., M, $N_m$ is a positive integer greater than or equal to 1, and the sleep time is used to indicate a time length in which monitoring the PDCCH is stopped.

The sending module 402 is configured to send a first message to a terminal device, where the first message includes the M sleep time sets.

The processing module 401 is further configured to determine sleep time indication information, where the sleep time indication information is used to indicate a target sleep time index, and the target sleep time index is an index in the M sleep time sets.

The sending module 402 is further configured to send a second message to the terminal device, where the second message includes the sleep time indication information.

The sending module 402 may be implemented by a transmitter. The processing module 401 may be implemented by a processor. For specific functions and beneficial effects of the sending module 402 and the processing module 401, refer to the method shown in FIG. 1. Details are not described herein.

In a possible embodiment, a communications apparatus is further provided. The communications apparatus may be a base station, or may be a component (for example, a chip or a circuit) that can be used for a base station. The communications apparatus may include a transceiver and a processor, and optionally, may further include a memory. The transceiver may be configured to implement corresponding functions and operations of the receiving module and the sending module. The processor may be configured to implement a corresponding function and a corresponding operation of the processing module. The memory may be configured to store an execution instruction or application program code, and the processor controls execution of the execution instruction or the application program code, to implement the communication method provided in the foregoing embodiments of this application; and/or the memory may be configured to temporarily save some data, instruction information, and the like. The memory may exist independent of the processor. In this case, the memory may be connected to the processor by using a communications line. In still another possible design, the memory may alternatively be integrated with the processor. This is not limited in the embodiments of this application.

Figure 5:
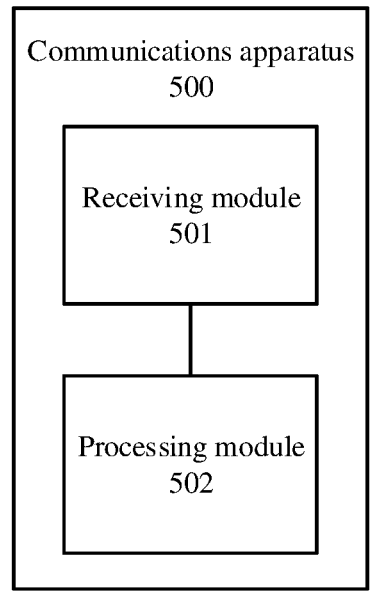
FIG. 5 is a structural block diagram of a communications apparatus according to an embodiment of this application.

FIG. 5 is a structural block diagram of a communications apparatus according to an embodiment of this application. The communications apparatus may be a terminal, or may be a component (for example, a chip or a circuit) that can be used for a terminal. As shown in FIG. 5, the communications apparatus 500 may include a receiving module 501 and a processing module 502.

The receiving module 501 is configured to receive a first message sent by a network device, where the first message is used to indicate the terminal device to stop running an on duration timer and/or an inactivity timer.

The processing module 502 is configured to: when that a running timer is only the on duration timer and/or the inactivity timer is determined, stop running the running timer and stop monitoring a physical downlink control channel (PDCCH).

In a possible manner, the receiving module 501 may be implemented by a receiver, and the processing module 502 may be implemented by a processor. For specific functions and beneficial effects of the receiving module 501 and the processing module 502, refer to the method shown in FIG. 2. Details are not described herein.

In a possible embodiment, a communications apparatus is further provided. The communications apparatus may be a terminal, or may be a component (for example, a chip or a circuit) that can be used for a terminal. The communications apparatus may include a processor, and optionally, may further include a transceiver and a memory. The processor may be configured to implement a corresponding function and a corresponding operation of the processing module. The memory may be configured to store an execution instruction or application program code, and the processor controls execution of the execution instruction or the application program code, to implement the communication method provided in the foregoing embodiments of this application; and/or the memory may be configured to temporarily save some data, instruction information, and the like. The memory may exist independent of the processor. In this case, the memory may be connected to the processor by using a communications line. In still another possible design, the memory may alternatively be integrated with the processor. This is not limited in the embodiments of this application.

Figure 6:
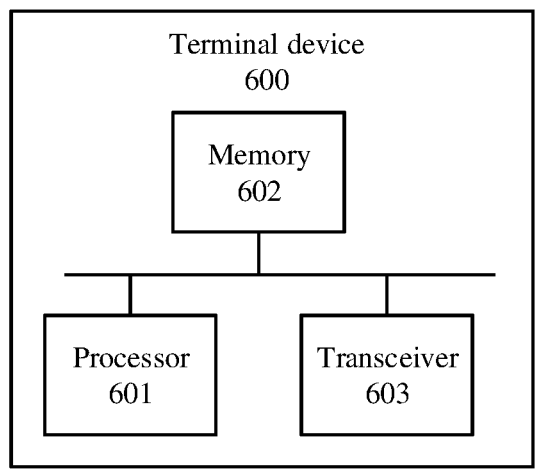
FIG. 6 is a structural block diagram of a terminal device according to an embodiment of the present invention.

FIG. 6 is a structural block diagram of a terminal device according to an embodiment of the present invention. As shown in FIG. 6, the terminal device 600 includes a processor 601, a memory 602, a radio frequency circuit, an antenna, and an input/output apparatus. The processor 601 may be configured to: process a communications protocol and communication data, control the terminal device, execute a software program, and process data and the like of the software program. The memory 602 is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus, such as a touchscreen, a display, or a keyboard, is mainly configured to: receive data entered by a user, and output data to the user. It should be noted that some types of terminal devices may not have an input/output apparatus.

When data needs to be sent, the processor 601 performs baseband processing on the to-be-sent data, and outputs a baseband signal to the radio frequency circuit. After performing radio frequency processing on the baseband signal, the radio frequency circuit sends a radio frequency signal to outside in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 6 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, an antenna and a radio frequency circuit that have receiving and sending functions may be considered as a transceiver 603 of the terminal device, and a processor having a processing function may be considered as a processing unit of the terminal device. The transceiver may also be referred to as a transceiver unit, a transceiver, a transceiver apparatus, or the like. The processing unit may also be referred to as a processor, a processing board, a processing module, a processing apparatus, or the like. Optionally, a component configured to implement a receiving function in the transceiver 603 may be considered as a receiving unit, and a component configured to implement a sending function in the transceiver 603 may be considered as a sending unit. In other words, the transceiver 603 includes the receiving unit and the sending unit. The receiving unit may also be sometimes referred to as a receiver, a receiver, a receiver circuit, or the like. The sending unit may also be sometimes referred to as a transmitter, a transmitter, a transmitter circuit, or the like.

The processor 601, the memory 602, and the transceiver 603 communicate with each other by using an internal connection path, to transfer a control signal and/or a data signal.

The method disclosed in the foregoing embodiments of the present invention may be applied to the processor 601, or may be implemented by the processor 601. The processor 601 may be an integrated circuit chip and has a signal processing capability. In an implementation process, steps in the foregoing methods can be implemented by using a hardware integrated logical circuit in the processor 601, or by using instructions in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and a processor reads instructions in the memory and completes the steps in the foregoing methods in combination with hardware of the processor.

Optionally, in some embodiments, the memory 602 may store an instruction used to perform the method performed by the terminal device according to the method shown in FIG. 1. The processor 601 may execute the instruction stored in the memory 602 to complete, in combination with other hardware (for example, the transceiver 603), the steps performed by the terminal device according to the method shown in FIG. 1. For a specific operation process and beneficial effects, refer to the descriptions in the embodiment shown in FIG. 1.

Optionally, in some embodiments, the memory 602 may store an instruction used to perform the method performed by the terminal device according to the method shown in FIG. 2. The processor 601 may execute the instruction stored in the memory 602 to complete, in combination with other hardware (for example, the transceiver 603), the steps performed by the terminal device according to the method shown in FIG. 2. For a specific operation process and beneficial effects, refer to the descriptions in the embodiment shown in FIG. 2.

Figure 7:
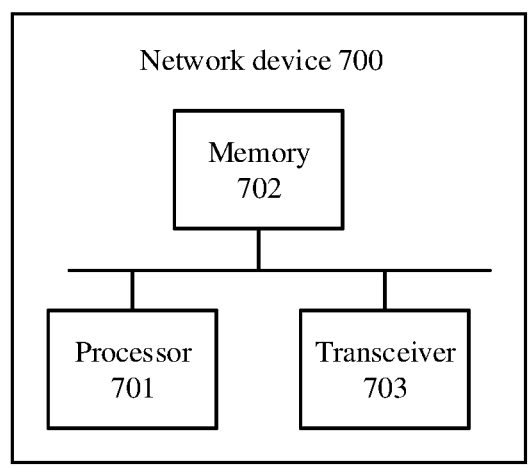
FIG. 7 is a structural block diagram of a network device according to an embodiment of the present invention.

FIG. 7 is a structural block diagram of a network device according to an embodiment of the present invention. The network device 700 shown in FIG. 7 includes a processor 701, a memory 702, and a transceiver 703.

The processor 701, the memory 702, and the transceiver 703 communicate with each other by using an internal connection path, to transfer a control signal and/or a data signal.

The method disclosed in the foregoing embodiments of the present invention may be applied to the processor 701, or may be implemented by the processor 701. The processor 701 may be an integrated circuit chip and has a signal processing capability. In an implementation process, steps in the foregoing methods can be implemented by using a hardware integrated logical circuit in the processor 701, or by using instructions in a form of software. The processor 701 may be a general purpose processor, a digital signal processor (DSP), an application-specific integrated circuit (ASIC), a field-programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory 702, and a processor 701 reads instructions in the memory 702 and completes the steps in the foregoing methods in combination with hardware of the processor.

Optionally, in some embodiments, the memory 702 may store an instruction used to perform the method performed by the network device according to the method shown in FIG. 1. The processor 701 may execute the instruction stored in the memory 702 to complete, in combination with other hardware (for example, the transceiver 703), the steps performed by the network device according to the method shown in FIG. 1. For a specific operation process and beneficial effects, refer to the descriptions in the embodiment shown in FIG. 3.

Optionally, in some embodiments, the memory 702 may store an instruction used to perform the method performed by the network device according to the method shown in FIG. 2. The processor 701 may execute the instruction stored in the memory 702 to complete, in combination with other hardware (for example, the transceiver 703), the steps performed by the network device according to the method shown in FIG. 2. For a specific operation process and beneficial effects, refer to the descriptions in the embodiment shown in FIG. 3.

An embodiment of this application further provides a chip. The chip includes a transceiver unit and a processing unit. The transceiver unit may be an input/output circuit or a communications interface. The processing unit is a processor, a microprocessor, or an integrated circuit integrated on the chip. The chip may perform the method performed on the network device side in the foregoing embodiments.

In another form of this embodiment, a computer-readable storage medium is provided. The computer-readable storage medium stores an instruction, and when the instruction is executed, the method on the network device side in the foregoing method embodiments is performed.

In another form of this embodiment, a computer program product including an instruction is provided. When the instruction is executed, the method on the network device side in the foregoing method embodiments is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method of controlling a monitoring of a physical downlink control channel (PDCCH), comprising:
monitoring the PDCCH;
receiving, by a communications apparatus, a first message sent by a network device, wherein the first message comprises M sleep time sets, the $m^{th}$ sleep time set in the M sleep time sets comprises $N_m$ indexes and $N_m$ sleep times, the $N_m$ indexes are in a one-to-one correspondence with the $N_m$ sleep times, m=1, . . . , M, $N_m$ is a positive integer greater than or equal to 1, and the sleep time is used to indicate a time length in which monitoring the PDCCH is stopped;
receiving, by the communications apparatus, a second message sent by the network device, wherein the second message comprises sleep time indication information, the sleep time indication information is used to indicate a target sleep time index, and the target sleep time index is an index in the M sleep time sets; and
stopping, by the communications apparatus, the monitoring of the PDCCH in a target time period, wherein a time length of the target time period corresponds to a time length that is indicated by a target sleep time and in which the monitoring of the PDCCH is stopped, and the target sleep time corresponds to the target sleep time index.

2. The method according to claim 1, wherein the sleep time is measured in a form of a discontinuous reception (DRX) cycle or a time unit;
wherein the first message further comprises time unit indication information, and the time unit indication information is used to indicate that the sleep time is measured in a form of the DRX cycle or the time unit.

3. The method according to claim 2, wherein when the sleep time is measured in a form of the DRX cycle, if the communications apparatus receives the sleep time indication information before the $n^{th}$ DRX cycle, the target time period is the $n^{th}$ DRX cycle to the $(n+x-1)^{th}$ DRX cycle;
when the communications apparatus receives the sleep time indication information on the first PDCCH occasion within on duration of the $n^{th}$ DRX cycle, the target time period is the $n^{th}$ DRX cycle to the $(n+x-1)^{th}$ DRX cycle; or when the communications apparatus receives the sleep time indication information on the $n_{th}$ PDCCH occasion within the on duration of the $n^{th}$ DRX cycle, the target time period is the $(n+1)^{th}$ DRX cycle to the $(n+x)^{th}$ DRX cycle, wherein x is the time length that is indicated by the target sleep time and in which monitoring the PDCCH is stopped, and x and n are positive integers greater than or equal to 1.

4. The method according to claim 2, wherein when the time length is measured in a form of the DRX cycle, if the communications apparatus receives the sleep time indication information before the $n^{th}$ DRX cycle, the target time period is the $n^{th}$ DRX cycle to the $(n+x-1)^{th}$ DRX cycle; or when the communications apparatus receives the sleep time indication information on a PDCCH occasion within on duration of the $n^{th}$ DRX cycle, the target time period is from a moment at which the communications apparatus receives the sleep time indication information to the $(n+x-1)^{th}$ DRX cycle, wherein x is the time length that is indicated by the target sleep time and in which monitoring the PDCCH is stopped, and x and n are positive integers greater than or equal to 1.

5. The method according to claim 2, wherein when the time length is measured in a form of the DRX cycle, if the communications apparatus receives the sleep time indication information before the $n^{th}$ DRX cycle, the target time period is the $n^{th}$ DRX cycle to the $(n+x-1)^{th}$ DRX cycle; or when the communications apparatus receives the sleep time indication information on a PDCCH occasion within on duration of the $n^{th}$ DRX cycle, the target time period is the $(n+1)^{th}$ DRX cycle to the $(n+x)^{th}$ DRX cycle, wherein x is the time length that is indicated by the target sleep time and in which monitoring the PDCCH is stopped, and x and n are positive integers greater than or equal to 1.

6. The method according to claim 3, wherein the stopping, by the communications apparatus, the monitoring of the PDCCH in the target time period comprises: skipping running, by the communications apparatus, an on duration timer in the target time period.

7. The method according to claim 3, wherein the stopping, by the communications apparatus, the monitoring of the PDCCH in the target time period comprises: enabling, by the communications apparatus, a first timer after receiving the sleep time indication information; and if the first timer is running, skipping enabling, by the communications apparatus, an on duration timer, wherein a length of the first timer is x DRX cycles, x−1 DRX cycles, or x+1 DRX cycles.

8. The method according to claim 2, wherein when the sleep time is measured in a form of the time unit, the stopping, by the communications apparatus, of the monitoring of the PDCCH in the target time period comprises:

stopping, by the communications apparatus, monitoring the PDCCH in x time units starting from a moment of receiving the sleep time indication information, wherein x is the time length that is indicated by the target sleep time and in which monitoring the PDCCH is stopped, and x is a positive integer greater than or equal to 1.

9. The method according to claim 8, wherein the stopping, by the communications apparatus, of the monitoring of the PDCCH in the x time units starting from the moment of receiving the sleep time indication information comprises:

skipping running, by the communications apparatus, an on duration timer or an inactivity timer in the x time units starting from the moment of receiving the sleep time indication information.

10. The method according to claim 2, wherein M is a positive integer greater than 1, M DRX parameter sets are configured for the communications apparatus, the M sleep time sets are in a one-to-one correspondence with the M DRX parameter sets, and the method further comprises:

determining, by the communications apparatus, a target sleep time set, wherein the target sleep time set is a sleep time set that is in the M sleep time sets and that corresponds to a DRX parameter set currently used by the communications apparatus; and determining, by the communications apparatus, a sleep time corresponding to the target sleep time index in the target sleep time set as the target sleep time.

11. The method according to claim 1, wherein the method further comprises:

if the communications apparatus triggers a buffer status report in the target time period, and the buffer status report meets a condition for triggering a scheduling request, triggering the scheduling request after the target time period ends.

12. The method according to claim 1, wherein the method further comprises:

if the communications apparatus triggers a buffer status report in the target time period, the buffer status report meets a condition for triggering a scheduling request, and a logical channel for triggering the buffer status report allows delaying triggering the scheduling request, triggering the scheduling request after the target time period ends.

13. The method according to claim 1, wherein the method further comprises: when receiving the sleep time indication information, switching, by the communications apparatus, a downlink (DL) bandwidth part (BWP) of a current primary serving cell to a target DL BWP, wherein the target DL BWP is a DL BWP with a minimum bandwidth, a default DL BWP, or an initial DL BWP in DL BWPs configured for a corresponding serving cell.

14. The method according to claim 1, wherein the method further comprises: when receiving the sleep time indication information, switching, by the communications apparatus, downlink (DL) bandwidth parts (BWPs) of all secondary serving cells in an active state to a target DL BWP, wherein the target DL BWP is a DL BWP with a minimum bandwidth, a default DL BWP, or an initial DL BWP in DL BWPs configured for a corresponding serving cell.

15. The method according to claim 1, wherein the method further comprises: when receiving the sleep time indication information, deactivating, by the communications apparatus, all secondary serving cells in an active state.

16. The method according to claim 1, wherein the second message further comprises secondary serving cell deactivation indication information, and the secondary serving cell deactivation indication information is used to indicate to deactivate all secondary serving cells in an active state or deactivate some of the secondary serving cells in the active state; and the method further comprises: deactivating, by the communications apparatus, a secondary serving cell in an active state that is indicated by the secondary serving cell deactivation indication information.

17. The method according to claim 1, wherein the first message further comprises a time threshold, and the method further comprises: when the communications apparatus receives the sleep time indication information, if a length of the target sleep time is greater than or equal to the time threshold, deactivating, by the communications apparatus, all secondary serving cells in an active state.

18. The method according to claim 1, wherein before the communications apparatus receives the sleep time indication information, the method further comprises: reporting, by the communications apparatus, at least one expected sleep time to the network device.

19. The method according to claim 18, wherein the at least one expected sleep time is carried in terminal device capability information, terminal device assistance information, a radio resource control (RRC) connection setup complete message, an RRC connection resume complete message, or an RRC connection reestablishment complete message.

20. A communications apparatus, wherein the communications apparatus comprises a module configured to at least implement steps including:

monitoring a physical downlink control channel (PDCCH);

receiving a first message sent by a network device, wherein the first message comprises M sleep time sets, the $m^{th}$ sleep time set in the M sleep time sets comprises $N_m$ indexes and $N_m$ sleep times, the $N_m$ indexes are in a one-to-one correspondence with the $N_m$ sleep times, m=1, . . . , M, $N_m$ is a positive integer greater than or equal to 1, and the sleep time is used to indicate a time length in which monitoring the PDCCH is stopped;

receiving a second message sent by the network device, wherein the second message comprises sleep time indication information, the sleep time indication information is used to indicate a target sleep time index, and the target sleep time index is an index in the M sleep time sets; and stopping the monitoring of the PDCCH in a target time period, wherein a time length of the target time period corresponds to a time length that is indicated by a target sleep time and in which the monitoring of the PDCCH is stopped, and the target sleep time corresponds to the target sleep time index.

* * * * *